US011094207B2

(12) United States Patent
Khatwa et al.

(10) Patent No.: US 11,094,207 B2
(45) Date of Patent: Aug. 17, 2021

(54) COCKPIT DISPLAY OF TRAFFIC INFORMATION (CDTI) ASSISTED VISUAL SEPARATION EMPLOYING A VERTICAL SITUATION DISPLAY

(71) Applicant: HONEYWELL INTERNATIONAL INC., Morris Plains, NJ (US)

(72) Inventors: Ratan Khatwa, Sammamish, WA (US); Melissa Ziarnick, Anthem, AZ (US); Helena Trefilova, Brno (CZ); Pavel Klang, Brno (CZ); Stephen Whitlow, St. Louis Park, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 67 days.

(21) Appl. No.: 16/682,603

(22) Filed: Nov. 13, 2019

(65) Prior Publication Data

US 2020/0168110 A1 May 28, 2020

Related U.S. Application Data

(63) Continuation of application No. 15/647,471, filed on Jul. 12, 2017, now Pat. No. 10,490,089.

(51) Int. Cl.

| | |
|---|---|
| ***G08G 5/02*** | (2006.01) |
| ***G08G 5/00*** | (2006.01) |
| *G01S 13/95* | (2006.01) |

(52) U.S. Cl.

CPC ........... *G08G 5/025* (2013.01); *G08G 5/0008* (2013.01); *G08G 5/0021* (2013.01); *G08G 5/0052* (2013.01); *G08G 5/0078* (2013.01)

(58) Field of Classification Search

CPC ............ G08G 5/02; G08G 5/00; G08G 5/025; G08G 5/0008; G08G 5/04; G02B 27/01; G06F 19/00; G01S 13/95; G01S 13/91; G01S 7/04

See application file for complete search history.

(56) References Cited

U.S. PATENT DOCUMENTS

| | | | |
|---|---|---|---|
| 6,085,129 | A | 7/2000 | Schardt et al. |
| 7,321,318 | B2 | 1/2008 | Crane et al. |
| 8,203,465 | B2 | 6/2012 | Shafaat et al. |
| 8,417,397 | B2 | 4/2013 | Khatwa et al. |
| 8,626,428 | B2 | 1/2014 | Ramaiah et al. |
| 9,105,183 | B2 | 8/2015 | Samuthirapandian et al. |

(Continued)

OTHER PUBLICATIONS

U.S. Department of Transportation, Federal Aviation Administration, Advisory Circular, "Airworthiness Approval for ADS-B In Systems and Applications,"May 20, 2015.

*Primary Examiner* — Tan Q Nguyen
(74) *Attorney, Agent, or Firm* — Lorenz & Kopf, LLP

(57) ABSTRACT

Systems and methods directed to improvements in the presentation of CAVS procedures on an aircraft display system over what is conventionally available are provided. The provided systems and methods employ a vertical situation display (VSD), thereby presenting additional relevant visual approach information, such as a vertical distance between the ownship and the target aircraft, descent rates of the ownship and the target and an alerting function for the user-selected CAVS range. The provided systems and methods also capably receive and process user selections of target aircraft from both the lateral display and the VSD.

16 Claims, 6 Drawing Sheets

(56) References Cited

U.S. PATENT DOCUMENTS

| | | | | |
|---|---|---|---|---|
| 9,567,099 | B2 | 2/2017 | Poux et al. | |
| 2003/0025719 | A1 | 2/2003 | Palmer et al. | |
| 2011/0006918 | A1 | 1/2011 | Shafaat et al. | |
| 2011/0282568 | A1* | 11/2011 | Khatwa ................ | G08G 5/0078 701/121 |
| 2013/0006511 | A1 | 1/2013 | Ramaiah et al. | |
| 2013/0113635 | A1* | 5/2013 | Whitlow .............. | G08G 5/0008 340/945 |
| 2014/0118188 | A1 | 5/2014 | Khatwa et al. | |
| 2014/0188312 | A1 | 7/2014 | Boorman et al. | |
| 2015/0120177 | A1 | 4/2015 | Palanisamy et al. | |
| 2017/0103660 | A1* | 4/2017 | Shafaat .................. | B64D 45/04 |
| 2019/0139423 | A1* | 5/2019 | Frerotte ............... | G08G 5/0026 |

* cited by examiner

COCKPIT DISPLAY OF TRAFFIC INFORMATION (CDTI) ASSISTED VISUAL SEPARATION EMPLOYING A VERTICAL SITUATION DISPLAY

CROSS-REFERENCE TO RELATED APPLICATION

This application is a continuation of application Ser. No. 15/647,471, filed Jul. 12, 2017, now U.S. Pat. No. 10,490, 089.

TECHNICAL FIELD

The technical field generally relates to aircraft safety and notification systems, and more particularly relates to systems and related operating methods for employing a Vertical Situation Display (VSD) in Cockpit Display of Traffic Information (CDTI) assisted visual separation.

BACKGROUND

The phase of flight prior to landing an aircraft is referred to as "approach," requiring an approach procedure. Approach procedures at a crowded landing situation may involve multiple aircraft lining up sequentially and following each other (in a manner often referred to as "in-trail"), at the direction of Air Traffic Control (ATC). Approach procedures may be instrument based or visual. A visual approach requires the pilot of an ownship to be able to see, out-the-window of the ownship, another "target" aircraft, and follow it, for at least a portion of the approach procedure, perhaps until the target aircraft lands. In undertaking a visual approach, the pilot accepts responsibility to maintain, until landing, an ATC designated visual in-trail "separation distance" between the ownship and the target aircraft, and the weather conditions must be suitable for visibility.

In low visibility instances, a pilot may intermittently lose his out-the-window view of the target aircraft. In those instances, the pilot may additionally rely on a Cockpit Display of Traffic Information (CDTI) to track the target aircraft and maintain the designated separation distance, thereby being able to maintain or not abandon the visual approach. In support of this, procedures for CDTI Assisted Visual Separation (CAVS) have been developed. Conventionally, the CDTI is displayed as a top down view on a lateral, or navigation, display on an aircraft display system. As may be readily understood, the presentation of CAVS information in a top down view either completely omits or ineffectively conveys a variety of relevant vertical visual approach information.

Accordingly, systems and methods directed to improvements in the presentation of CAVS procedures on an aircraft display system over what is conventionally available are desirable. The desirable systems and methods employ a vertical display, thereby providing additional relevant visual approach information, such as a vertical distance between the ownship and the target aircraft, and descent rates of the ownship and the target aircraft. The following disclosure provides these technological enhancements over conventional CAVS procedures, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter. 2

In accordance with an embodiment, a Cockpit Display of Traffic Information (CDTI) assisted Visual Separation (CAVS) System is provided. The CAVS system comprising: a lateral display; a vertical situation display (VSD); and a control module coupled to the lateral display and the VSD, the control module comprising a processor and a memory device, and configured to: (a) identify neighbor traffic based on traffic data received from an automatic dependent surveillance broadcast (ADS-B), (b) command the lateral display to render a lateral image and the VSD to render a vertical image, each image comprising the neighbor traffic and features associated with a cockpit display of traffic information (CDTI) Assisted Visual Separation (CAVS) application, (c) receive a user selected traffic subsequent to (b), and, (d) responsive to (c), command the lateral display and the VSD to concurrently, update the lateral image and the vertical image to (i) visually distinguish the user selected traffic from remaining neighbor traffic, and (ii) depict a user selected range distance.

Also provided is a method for Cockpit Display of Traffic Information (CDTI) assisted Visual Separation (CAVS), comprising: at a control module, (a) identifying neighbor traffic; (b) filtering the neighbor traffic with a predetermined data quality criteria; (c) commanding a vertical situation display (VSD) to render filtered traffic in a visually distinct manner with respect to remaining neighbor traffic in a vertical image; (d) concurrently with (c), commanding a lateral display to render neighbor traffic in a lateral image; (e) receiving a user selected traffic from the VSD subsequent to (d); and, (f) responsive to (e), commanding the lateral display and the VSD to concurrently visually distinguish the user selected traffic from remaining neighbor traffic.

In accordance with another embodiment, a Cockpit Display of Traffic Information (CDTI) assisted visual separation (CAVS) system on an ownship is provided. The CAVS system comprising: a lateral display; a vertical situation display (VSD); and a control module coupled to the lateral display and the VSD, the control module comprising a processor and a memory device, and configured to: (a) process traffic data received to identify neighbor traffic; (b) filter the neighbor traffic with a predetermined data quality criteria; (c) command the lateral display to render an image comprising the neighbor traffic; (d) command a vertical situation display (VSD) to render filtered traffic in a visually distinct manner with respect to remaining neighbor traffic; (e) receive a user selected traffic subsequent to (d), and, (f) responsive to (e), command the lateral display and the VSD to concurrently, update the lateral image and the vertical image to (i) visually distinguish the user selected traffic from remaining neighbor traffic, and (ii) depict a user selected range distance.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a CAVS VSD module (FIG. 1, 104), and may be separate from, or integrated within, a preexisting mobile platform management system or aircraft flight management system (FMS).

Figure 1:
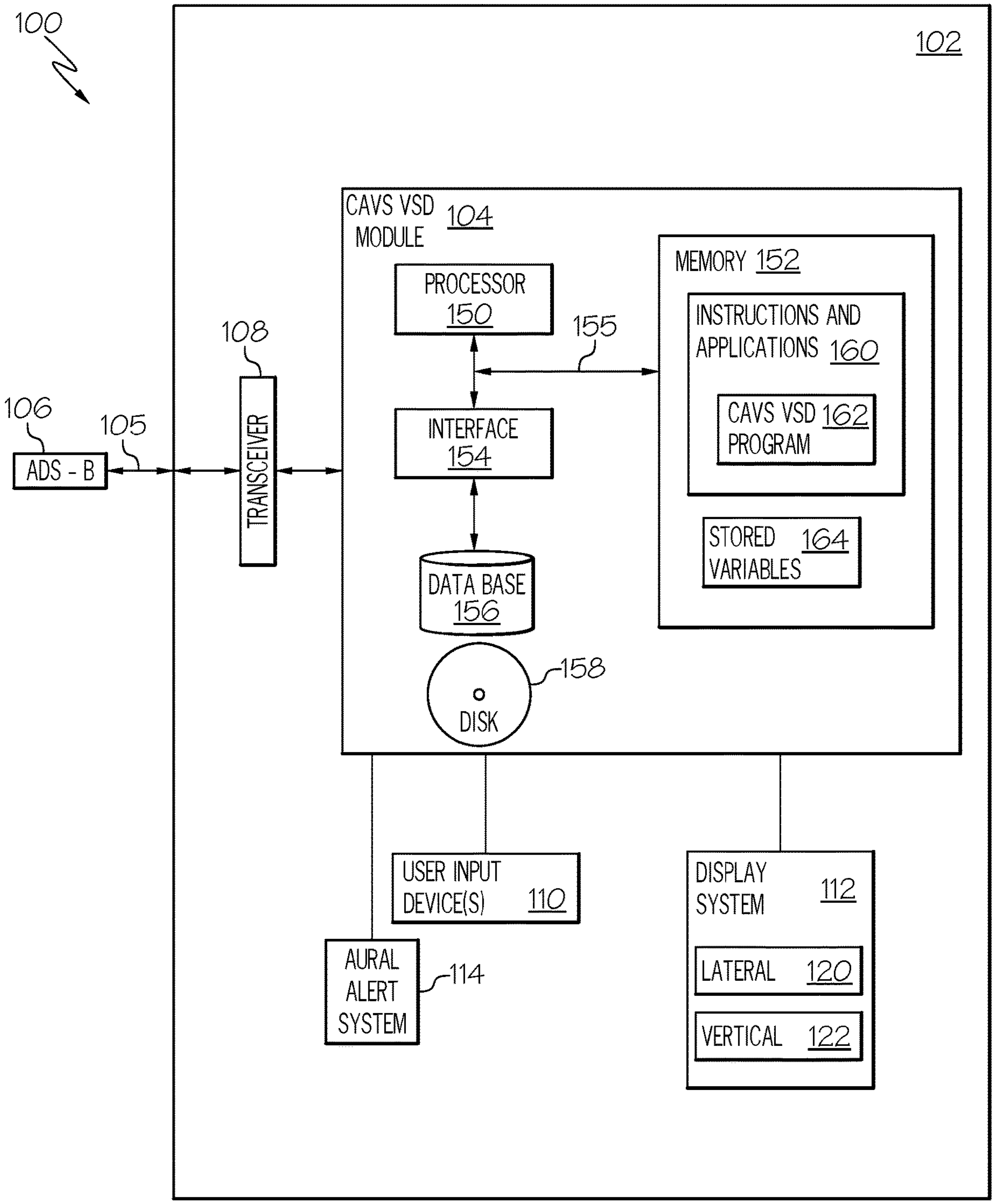
FIG. 1 is a functional block diagram illustrating a CAVS Vertical Situation Display (VSD) system, in accordance with various exemplary embodiments.

The disclosed control module provides an enhancement over conventional CDTI Assisted Visual Separation systems, in part, by integrating CAVS procedures on both a vertical situation display (VSD) and a lateral display on an aircraft display system. As used herein, the control module is the CAVS VSD module (FIG. 1, 104). In operation, the CAVS VSD module 104 displays neighbor traffic on both a lateral display image (FIG. 2-9, 202) and a vertical display image (FIGS. 2-9, 204), responds to user selections of traffic on either of the displays (FIG. 1, 120, 122) the user selections occurring subsequent to the displaying of the neighbor traffic, and updates both displays concurrently. The below description provides more detail as to these functions. In addition, the disclosed CAVS VSD module 104 filters the received neighbor traffic data (for example, Automatic Dependent Surveillance-Broadcast (ADS-B) data) and does not allow selection of neighbor traffic that do not meet predetermined data quality criteria.

Turning now to FIG. 1, a functional block diagram 100 of a CAVS VSD system 102 is depicted, in accordance with various exemplary embodiments. Although the depicted CAVS VSD system 102 is generally realized within an aircraft, the concepts presented here can be deployed in a variety of mobile platforms, such as vehicles, spacecraft, watercraft, and the like. In the depicted embodiment, the CAVS VSD system 102 includes: the control module (CAVS VSD module 104) that is electronically coupled to a user input device 110, a display system 112, and an aural alert system 114. In addition, the CAVS VSD module 104 receives via transceiver 108, wireless signals 105 comprising traffic data. In various embodiments, the traffic data is provided from an ADS-B source 106. The operation of these functional blocks is described in more detail below.

Neighbor traffic are understood to have appropriate ADS-B out capability, such that the ADS-B source 106 may provide reliable traffic data. In the depicted embodiment, the CAVS VSD module 104 processes traffic data received from the ADS-B source 106 and identifies neighbor traffic therein. The CAVS VSD module 104 commands the display system 112 to render images comprising the neighbor traffic and other features associated with a cockpit display of traffic information (CDTI) for a pilot to review. In various embodiments, the CAVS VSD module 104 filters the ADS-B data with one or more predetermined data quality criteria, generating therefrom a subset of the neighbor traffic in the ADS-B data, referred to herein as filtered data. The CAVS VSD module 104 may then command a vertical situation display, VSD 122, to display the filtered data in a visually distinct manner with respect to the remaining neighbor traffic, and may limit a pilot's selection on the VSD 122 to only neighbor traffic within the filtered traffic subset. Doing so provides a technical benefit of, when selected via the VSD 122, ensuring that the pilot's neighbor traffic selection meets the increased data quality criteria. The pilot may rely on various aspects of this displayed traffic data in the course of operating an aircraft.

In some embodiments, wireless signals 105 comprise wireless signal from other wireless sources of data. For example, wireless signals 105 may be provided by a datalink and air traffic control (ATC) system, an electronic flight bag (EFB)/electronic ground proximity warning system (EGPWS), a traffic collision and avoidance system (TCAS), a weather information system, and other systems as conventionally known to persons of skill in the art.

The transceiver 108 enables the CAVS VSD module 104 to establish and maintain the communications links to onboard components (not shown), and the ADS-B source 106. The transceiver 108 may include at least one receiver and at least one transmitter that are operatively coupled to the CAVS VSD module 104. The transceiver 108 can support wired and a variety of types of wireless communication, and can perform signal processing (e.g., digitizing, data encoding, modulation, etc.) as is known in the art. In some embodiments, the transceiver 108 is integrated with the CAVS VSD module 104.

In various embodiments, the user input device 110 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input device 110 include: entering values for stored variables 164, loading or updating instructions and applications 160, and loading and updating the contents of the database 156, each described in more detail below.

As depicted in FIG. 1, the display system 112 may be an integration of two components, a lateral display 120 and VSD 122. FIGS. 2-9 show various views of images on an integrated lateral display 120 (also referred to as a navigation display) and vertical situation display, VSD 122. The display system 112 components may be implemented using any one of numerous known display devices suitable for rendering textual, graphic, and/or iconic information in a format viewable by a user. The display devices may provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology. The various display device(s) 112 may each, individually, be responsive to user input via user input device(s) 110 and/or be under the control of the CAVS VSD module 104.

The aural alert system 114 may comprise any combination of speakers, bells, or alarms sufficient to generate sound that the pilot can hear. The aural alert system 114 may receive commands from the CAVS VSD module 104 and convert the commands into emitted sounds. Accordingly, the aural alert system 114 may comprise a means for converting the commands into emitted sounds.

The CAVS VSD module 104 performs the functions of the CAVS VSD system 102. With continued reference to FIG. 1, within the CAVS VSD module 104, the processor 150 and the memory 152 form a CAVS VSD engine that performs the processing activities. The CAVS VSD engine provides a technological improvement to the conventional display of CAVS information, in part, by providing a more comprehensive representation of the vertical separation between an ownship and a designated traffic, and visual and aural alerting when in-trail separation is compromised. The above described CAVS VSD engine performs the processing activities in accordance with the CAVS VSD program 162, as is described in more detail below.

The CAVS VSD module 104 also includes an interface 154, communicatively coupled to the processor 150 and memory 152 (via a bus 155), database 156, and an optional storage disk 158. In various embodiments, the CAVS VSD module 104 performs actions and other functions in accordance with steps of a method 1000 described in connection with FIG. 10. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

A computer readable storage medium, such as a memory 152, the database 156, or a disk 158 may be utilized as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164.

The database 156 are computer readable storage mediums in the form of any suitable type of storage apparatus, including direct access storage devices such as hard disk drives, flash systems, floppy disk drives and optical disk drives. The stored alert information for each event comprises: alert content, format and presentation, for a variety of display systems 112, as well as corrective actions for each event). Information in the databases 156 may be organized or imported during an initialization step (at 1002 of the method 1000 in FIG. 10).

The bus 155 serves to transmit programs, data, status and other information or signals between the various components of the CAVS VSD module 104. The bus 155 can be any suitable physical or logical means of connecting computer systems and components. This includes, but is not limited to, direct hard-wired connections, fiber optics, infrared and wireless bus technologies. During operation, the CAVS VSD program 162, stored in the memory 152, is loaded and executed by the processor 150.

The interface 154 enables communications within the CAVS VSD module 104, can include one or more network interfaces to communicate with other systems or components, and can be implemented using any suitable method and apparatus. For example, the interface 154 enables communication from a system driver and/or another computer system. In one embodiment, the interface 154 obtains the various traffic data from the ADS-B source 106 directly. The interface 154 may also include one or more network interfaces to communicate with technicians, and/or one or more storage interfaces to connect to storage apparatuses, such as the database 156.

During operation, the processor 150 loads and executes one or more programs, algorithms and rules embodied as instructions and applications 160 contained within the memory 152 and, as such, controls the general operation of the CAVS VSD module 104 as well as the CAVS VSD system 102. In executing the process described herein, such as the method 1000 of FIG. 10, the processor 150 loads and specifically executes the CAVS VSD program 162, to thereby realize an unconventional technological improvement to both the cockpit display and the analysis/use of ADS-B traffic data. Additionally, the processor 150 is configured to process received inputs (any combination of the user input provided via user input device 110, and traffic data from one or more of the ADS-B source 106), reference the database 156 in accordance with the CAVS VSD program 162, and command and control the display system 112 based thereon.

It will be appreciated that CAVS VSD system 102 may differ from the embodiment depicted in FIG. 1. As a first example, in various embodiments, sources other than the ADS-B source 106 may provide traffic information for processing by the CAVS VSD system 102. In addition, any combination of the user input device 110, the transceiver 108, and the display system 112 can be integrated, for example, as part of an existing FMS or cockpit display in an aircraft. Regardless of the state of integration of these systems, a user may control one or more features of the CAVS VSD system 102 by providing user input via at least the user input device 110.

Figure 2:
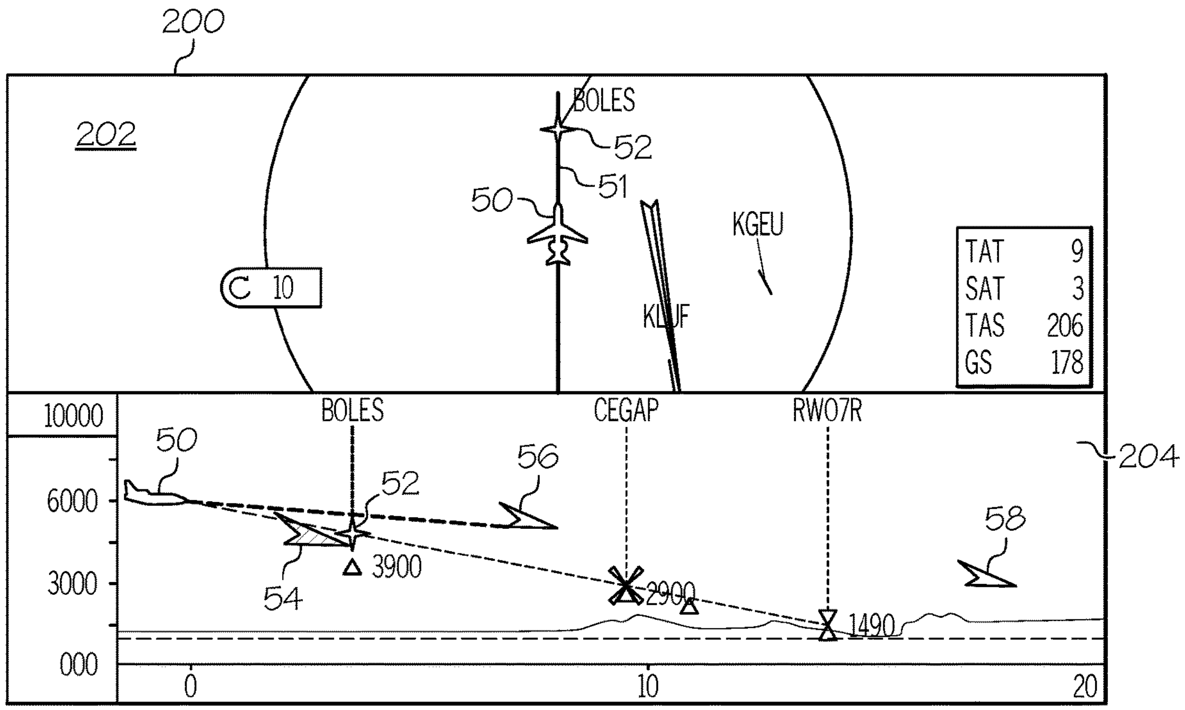
FIG. 2 is a two dimensional display system image showing neighbor traffic displayed on a VSD, in accordance with various exemplary embodiments.

FIGS. 2-9 are various depictions of images on a display system 112. Each of the images in FIGS. 2-9 comprise a lateral image 202 (provided by the lateral display 120) and vertical image 204 (provided by the VSD 122), in accordance with various embodiments. In the vertical images 204, a change in in altitude over time ("descent rate") may be readily observed. Turning now to FIG. 2, image 200 depicts the ownship 50 on a flight path 51 toward waypoint "BOLES" 52 in both the lateral image 202 and the vertical image 204. In addition, vertical image 204 depicts ADS-B neighboring traffic (54, 56, and 58) that has met the predetermined data quality criteria. Subsequent to the image 200 being updated with neighbor traffic data, a pilot or user may view image 200 and selectively, from either the lateral image 202 or the vertical image 204, select neighbor traffic as the target traffic to follow. As used herein, the term selectively implies that, in operation, both the lateral image 202 and the vertical image 204 are continuously and concurrently receptive to pilot selections.

Figure 3:
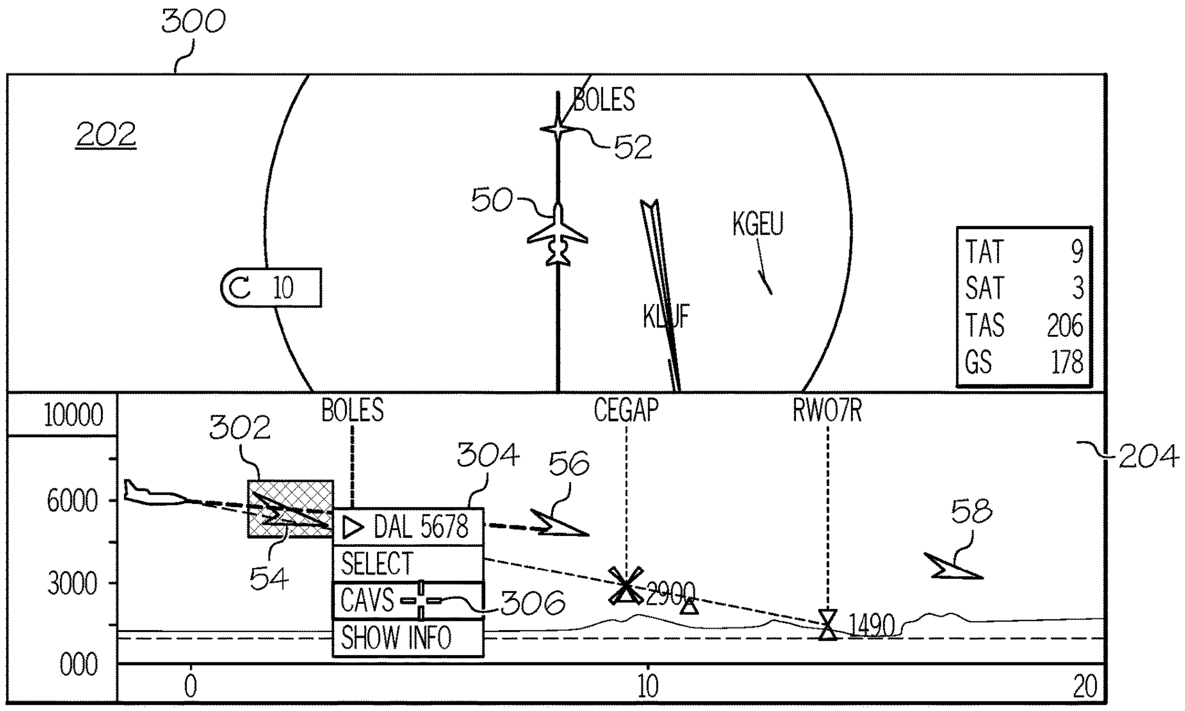
FIG. 3 is the display system image of FIG. 2, showing a user selected traffic on the VSD, in accordance with various exemplary embodiments.

Responsive to the user selection, the CAVS VSD module 102 employs one or more techniques to visually distinguish the user selection from remaining traffic on the vertical image 204 and the lateral image 202. Referring to FIG. 3, the display system 112 image 300 depicts a user selected traffic 54 on the vertical image 204. In various embodiments, responsive to the receiving the user selection, the CAVS VSD system 102 renders a highlighted shape 302 surrounding the selected traffic 54. In FIG. 3, the shape 302 is depicted as rectangular with rounded edges, however, a variety of shapes may be employed. Notably, the visually distinguishing technique used to distinguish the shape 302 does not completely occlude the view of the selected traffic 54, nor the view of other relevant features on the VSD 122. Also responsive to the user selected traffic 54, a text box or menu 304 providing the traffic identification for the selected traffic 54 (i.e., "DAL 5676") and a feature to select CAVS 306 option is displayed.

Figure 4:
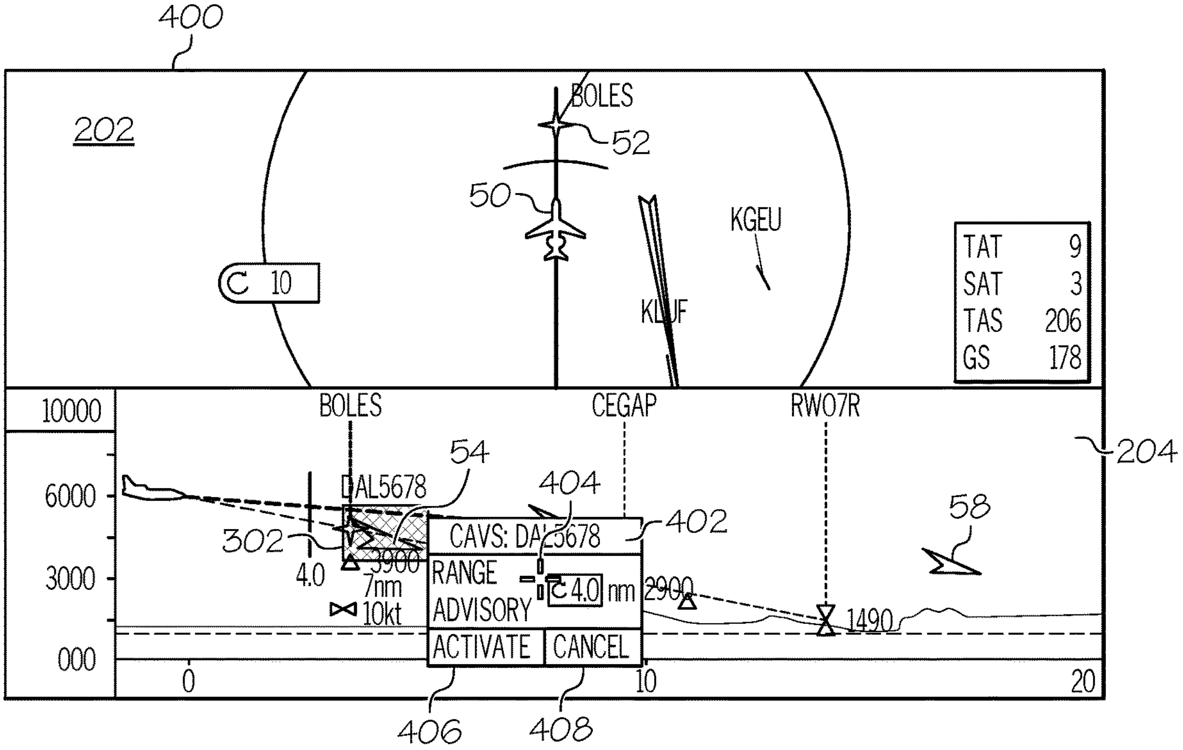
FIG. 4 is the display system image of FIG. 3, showing CAVS selected by a user, in accordance with various exemplary embodiments.

In FIG. 4, responsive to the user selecting the feature CAVS 306 in FIG. 3, the CAVS VSD system 102 displays a CAVS dialogue box 402 proximate to the selected traffic 54, on the vertical image 204, that prompts a user to enter a range distance 404. The range distance 404 offers the pilot an opportunity to visually demark, on both the lateral image 202 and the vertical image 204, a distance in front of the ownship to pay attention to. The range distance 404 may or may not be the same as the designated separation distance received from ATC. After the traffic to follow is selected and the range distance 404 is entered, the CAVS procedure is set up, and the user may select to activate 406 or deactivate 408 the CAVS procedure in CAVS dialogue box 402. The features CAVS 306 and CAVS dialogue box 402 are referred to as CAVS application features. Although the CAVS application features are depicted on the VSD 122, it is understood that they are also supported on the lateral display 120 or other display in the flight deck.

Figure 5:
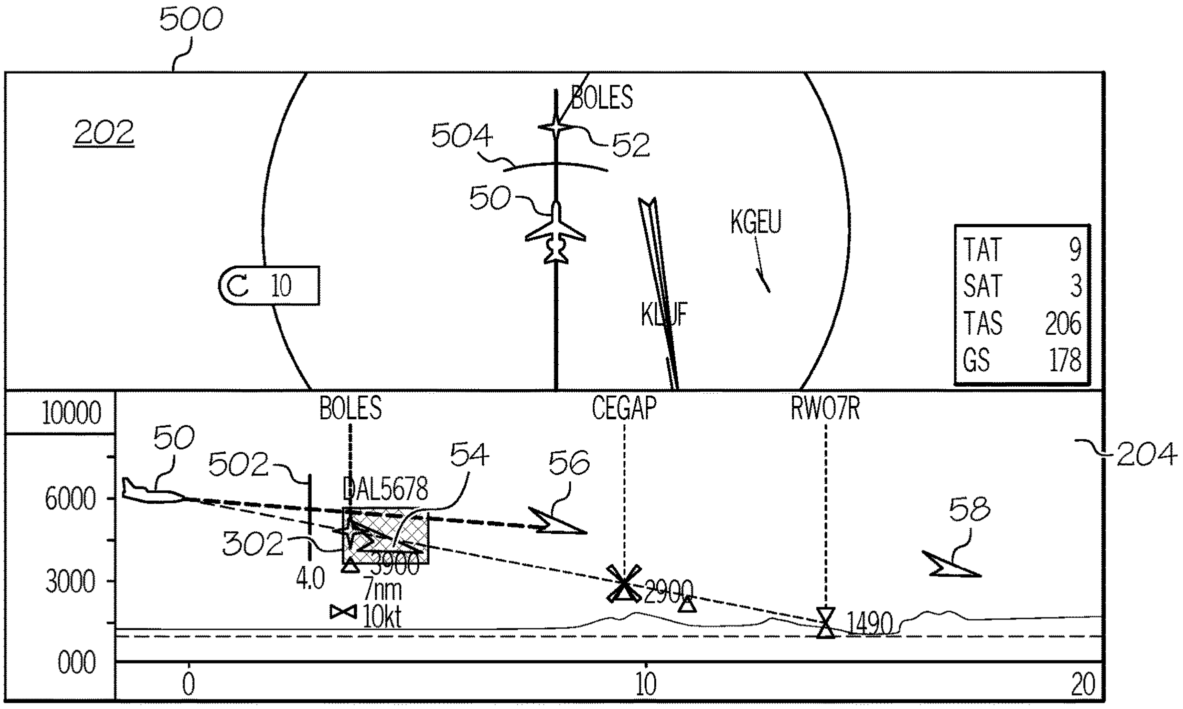
FIG. 5 is the display system image of FIG. 4, showing a user selected CAVS range distance, in accordance with various exemplary embodiments.

In FIG. 4, the user selected range distance 404 is four nautical miles. Turning to FIG. 5, responsive to the user selected range distance 404, the CAVS VSD system 102 commands the lateral display 120 and the VSD 122 to concurrently update the lateral image 202 and the vertical image 204 to concurrently depict the user selected range distance. In various embodiments, concurrently depicting the user selected range distance comprises displaying an arc 504 in the lateral image 202 and displaying a vertical line 502 in the vertical image 204. The vertical line 502 and the arc 504 are each rendered at the selected range distance 404 in front of the ownship (i.e., in the direction that the ownship is traveling on its flight path). Line thicknesses and extent (left or right and above or below the flight path) of the ownship 50 are among the predetermined values that may be stored in stored variables 164. As the ownship 50 travels forward, the CAVS VSD system 102 continuously updates the images (202, 204) such that the vertical line 502 and the arc 504 continue to be displayed at the range distance 404 in front of the ownship 50.

Figure 6:
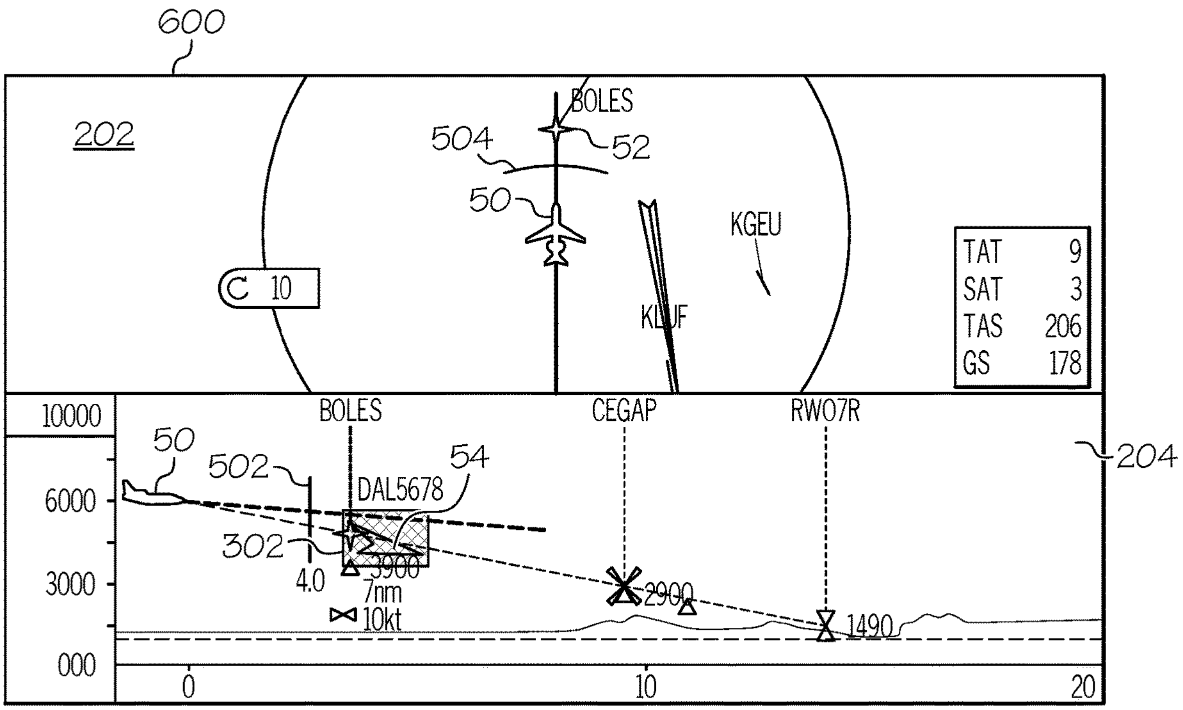
FIG. 6 is the display system image of FIG. 5, showing an optional removal of the display of other traffic targets, in accordance with various exemplary embodiments.
Figure 7:
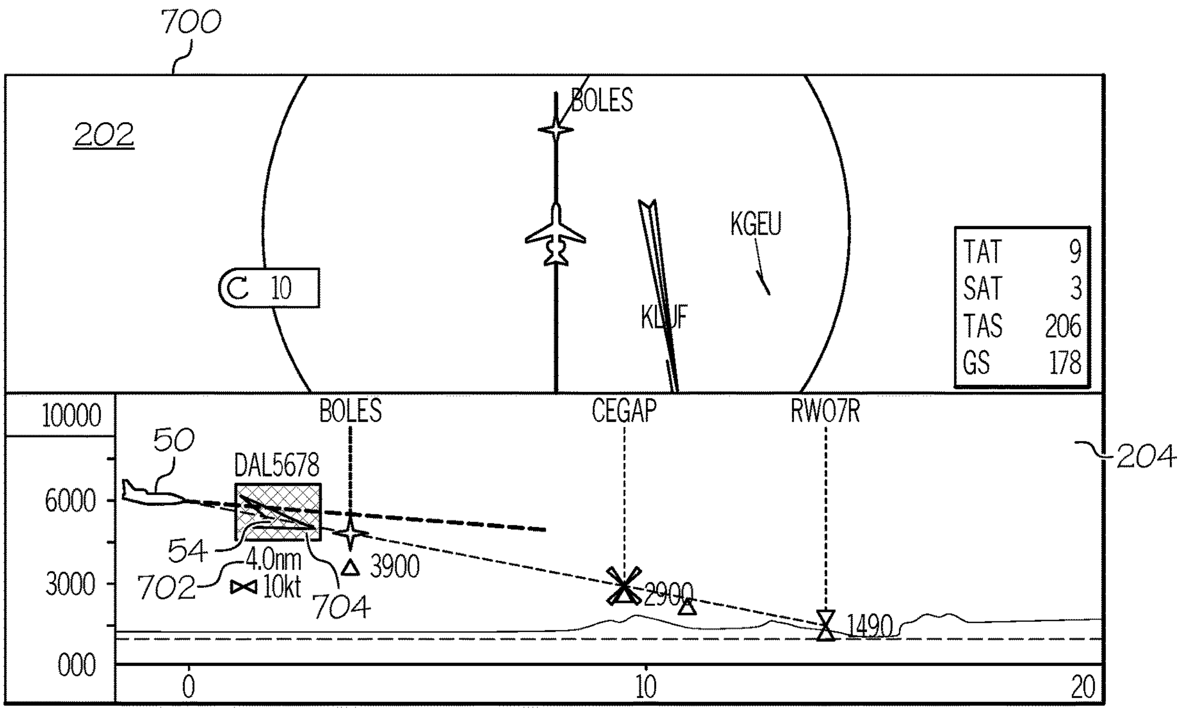
FIG. 7 is the display system image of FIG. 6, showing a first visual range alert, in accordance with various exemplary embodiments.
Figure 8:
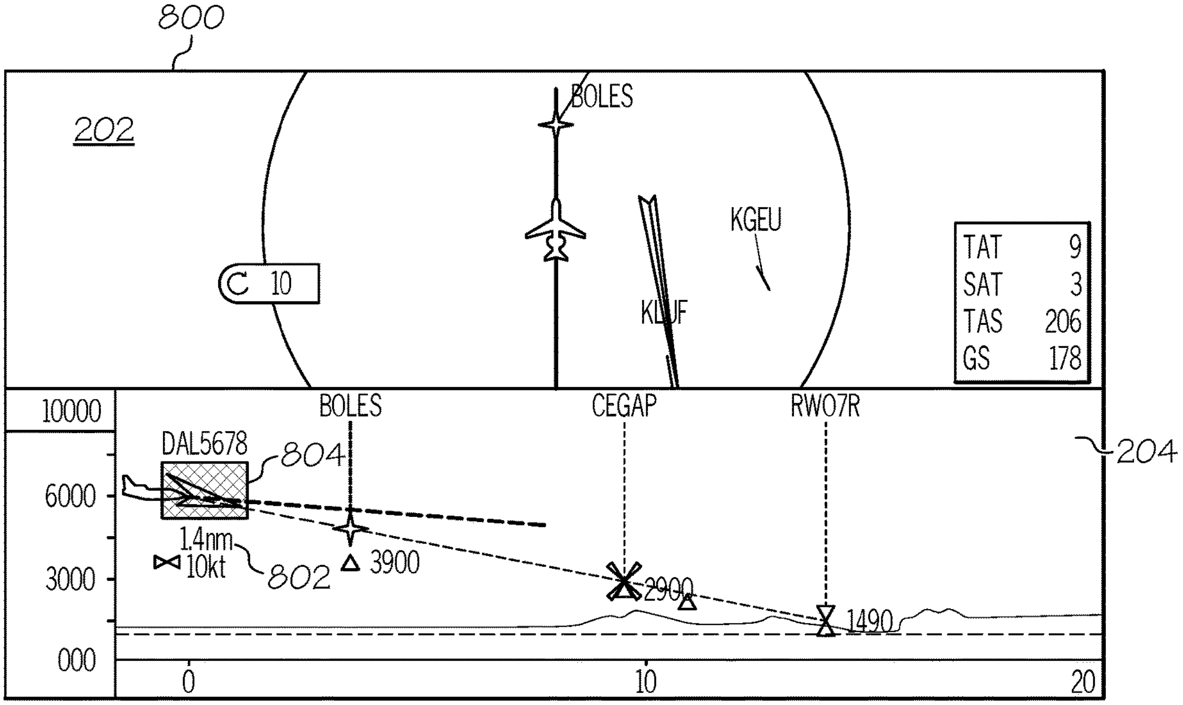
FIG. 8 is the display system image of FIG. 7, showing a second visual range alert, in accordance with various exemplary embodiments.

To further encourage/support the pilot's focus on the selected traffic 54, and minimize the pilot's distraction by other neighboring traffic, the CAVS VSD module 104 may additionally employ visual techniques to minimize or remove the other (unselected) neighbor traffic. In various embodiments, the other neighbor traffic (56, 58) may be shaded grey, or may be completely removed from the vertical image 204 on the VSD 122 (as is shown in FIG. 6).

As the ownship 50 travels, the distance between the ownship 50 and the selected traffic 54 may expand or shrink. The CAVS VSD module 104 continuously, and in real time, (i) determines the distance between the ownship 50 and the selected traffic 54, and (ii) compares that distance to the selected range distance 404. Based on the comparison, one or more different types of alerts may be generated. The generated alerts may have different levels of priority. For example, the CAVS VSD module 104 may generate a first alert of a first priority when it is determined that the distance between the ownship 50 and the selected traffic 54 is equal to the selected range distance 404; in various embodiments, the first alert may be an advisory alert. The CAVS VSD module 104 may display the generated advisory alert as one or more visually distinctive changes on the vertical image 204. For example, with reference to FIG. 7, the shape 302 may be replaced by a shape 704, having a different background color or shade from shape 302. Shape 704 may also have a different border color than the border color of shape 302. In various embodiments, shape 704 may also be a different size and/or a different form (i.e., a diamond shape, or a square) than shape 302. Regardless of the specific details, it is understood that shape 704 is different enough from shape 302 that it is readily observable, as an alert, to the pilot or a person viewing the displayed image 700. In addition to visual changes to the shape 704 surrounding the user selected traffic 54, the CAVS VSD module 104 may command the display system 112 to render the selected range difference 404 proximate to the shape 704 on the vertical image 204, as is shown at 702 in FIG. 7.

The CAVS VSD module 104 may generate a second alert of a second priority, the second alert being a higher priority than the first alert, and therefore more cautionary, when the CAVS VSD module 104 determines that the distance between the ownship 50 and the selected traffic 54 is less than the selected range distance 404. As with the advisory alert, the CAVS VSD module 104 may generate the cautionary alert as one or more visually distinctive changes on the vertical image 204. For example, with reference to FIG.

8, the shape 704 may be replaced by a shape 804, having a different background color or shade from shape 704. Shape 804 may also have a different border color than the border color of shape 704. In various embodiments, shape 804 may also be a different size and/or a different form (i.e., a diamond shape, or a square) than shape 704. Regardless of the specific details, it is understood that shape 804 is different enough from shape 704 (and shape 302) that it is noticeable to the pilot or a person viewing the displayed image 800. In addition to visual changes to the shape 804 surrounding the user selected traffic 54, the CAVS VSD module 104 may command the display system 112 to render the selected range difference 404 proximate to the shape 804 on the Vertical image 204, as is shown at 802 in FIG. 8. Due to the cautionary nature of the second alert, the CAVS VSD module 104 may also command the aural alert system 114 to emit an audible sound, coincident with commanding the display system 112 to render the cautionary alert.

Figure 9:
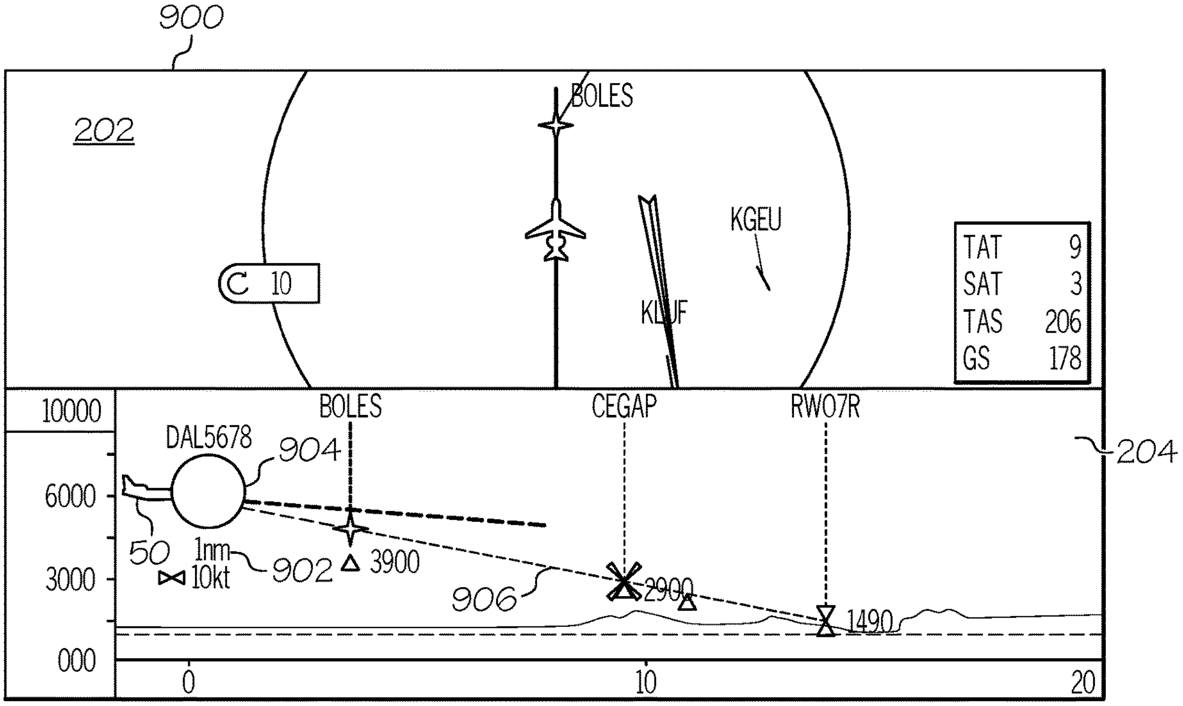
FIG. 9 is the display system image of FIG. 8, showing a third visual alert, associated with the ownship entering the TCAS protection zone, in accordance with various exemplary embodiments.

In various embodiments, the CAVS VSD module 104 may generate a third alert responsive to determining that the distance between the ownship 50 and the selected traffic 54 has decreased to the point of entering a Traffic Collision and Avoidance System (TCAS) protection zone. FIG. 9 depicts one non-limiting example of a third alert generated by the CAVS VSD module 104 responsive to determining that the ownship has entered the TCAS protection zone. In displayed image 900, shape 904 is rendered on the vertical image 204 in front of the ownship 50, on the path 906 of the ownship 50. The distance at which the TCAS protection zone starts is rendered below the shape 904, at 902. However, depending upon where the intruder is with respect to the ownship, the distance at which the TCAS protection zone starts may be in other locations. As with the other shape discussions, the shape 904 may have a different background color or shade, and a different border color than the border color of shape 804 (and 704 and 302). Shape 904 may also be a different size and/or a different form (i.e., in the embodiment of FIG. 9, shape 904 is a circle) than the previously used shapes. Regardless of the specific details, it is understood that shape 904 is different enough from shape 804, shape 704, and shape 302, that it is noticeable to the pilot or a person viewing the displayed image 900.

Figure 10:
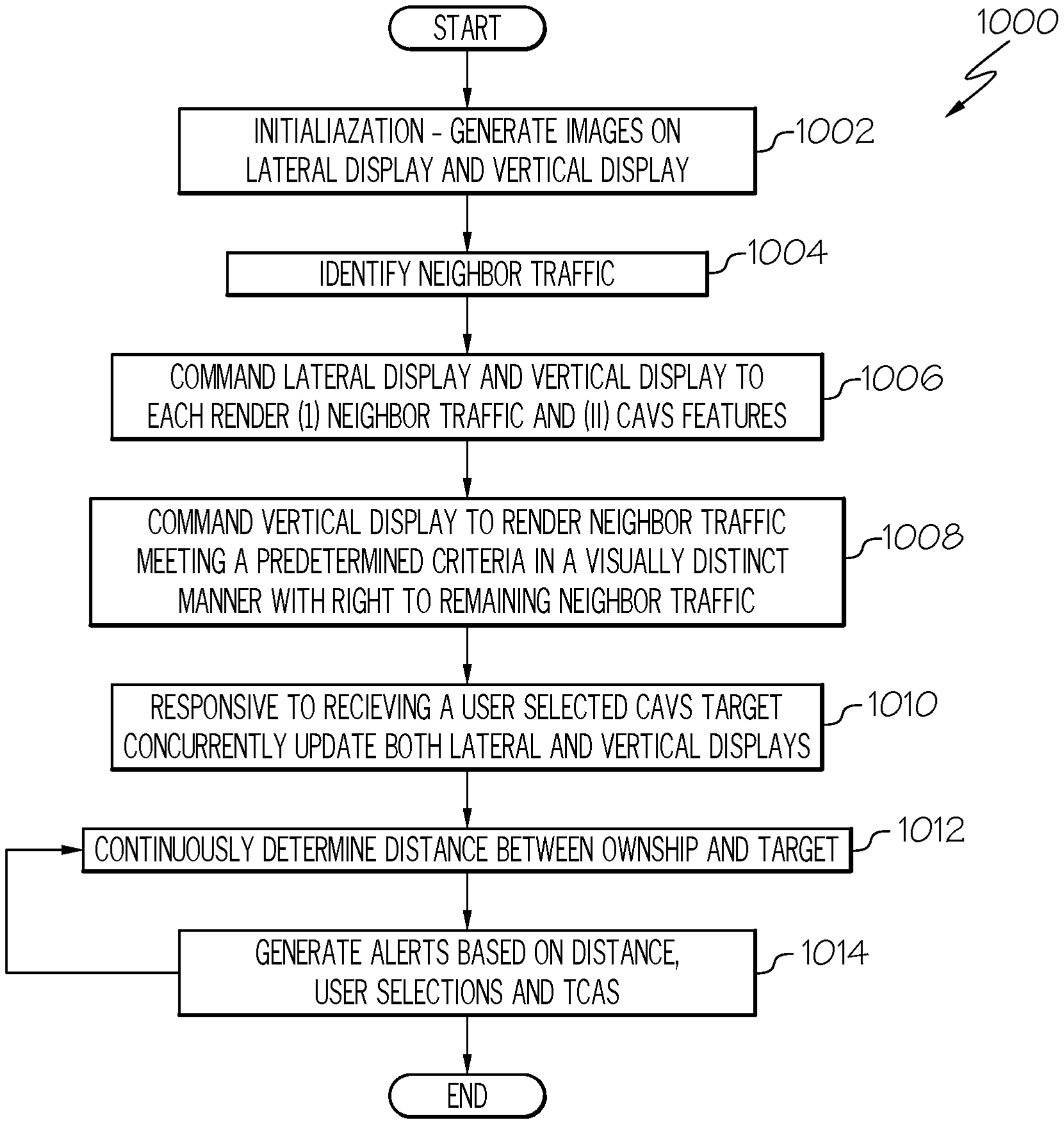
FIG. 10 is a flow chart describing a method for a CAVS VSD system, in accordance with various exemplary embodiments.

As mentioned, the processor 150 and the CAVS VSD program 162 form a CAVS VSD engine that continually, and in real time, determines the distance between an ownship 50 and a CAVS user selected traffic 54, and generates alerts in accordance with a set of rules encoded in the CAVS VSD program 162. Referring now to FIG. 10 and with continued reference to FIGS. 1-9, a flow chart is provided for a method 1000 for CAVS employing a VSD, in accordance with various exemplary embodiments. Method 1000 represents various embodiments of a method associated with the CAVS VSD system 102. For illustrative purposes, the following description of method 1000 may refer to elements mentioned above in connection with FIG. 1. In practice, portions of method 1000 may be performed by different components of the described system. It should be appreciated that method 1000 may include any number of additional or alternative tasks, the tasks shown in FIG. 10 need not be performed in the illustrated order, and method 1000 may be incorporated into a more comprehensive procedure or method having additional functionality not described in detail herein. Moreover, one or more of the tasks shown in FIG. 10 could be omitted from an embodiment of the method 1000 as long as the intended overall functionality remains intact.

The method starts, and at 1002 the CAVS VSD module 104 is initialized. As mentioned above, initialization may comprise uploading or updating instructions and applications 160, CAVS VSD program 162, stored variables 164, and the various lookup tables stored in the database 156. Generally, predetermined variables include, for example, an altitude above the ownship and an altitude below the ownship that defines a range line, range variables used for determining neighbor traffic, default range distances for alerts, various shapes and various colors and/or visually distinguishing techniques used for alerts. Default range distances may be based on, for example, the weight category of the CAVS selected target, e.g. 3 miles for a large transport category aircraft. In an embodiment, at 1002, the method 1000 initializes map data in a database 156. In some embodiments, CAVS VSD program 162 includes additional instructions and rules for rendering information differently based on type of display device in display system 112. Initialization at 1002 may also include identifying sources of traffic information and other input wireless signals 105, and referencing the CAVS VSD program 162 for predetermined data quality criteria that is applied to ADS-B data at 1008.

At 1004, neighbor traffic is identified. Identification of neighbor traffic may comprise processing ADS-B data with one or more range variables. In addition, at 1004, the ADS-B data may be filtered with one or more predetermined data quality criteria, generating therefrom a filtered data subset of the neighbor traffic in the ADS-B data. At 1006, the method 1000 commands the lateral display 120 and the VSD 122 to concurrently (i) render neighbor traffic, and (ii) render or support CAVS application features. At 1006, when the filtered data subset is generated and used, only neighbor traffic in the filtered data subset may be rendered on the VSD 122. In various embodiments, the rendering of the CAVS application features may not be observable until a user selects a neighbor traffic. As used herein, supporting CAVS application features means that, upon selecting a neighbor traffic, in either of the lateral display 120 or the VSD 122, CAVS application features, such as a prompt to enter a selected range distance, will appear on the respective display (see FIG. 3 and FIG. 4). In other words, at 1006, when the user selects the traffic 54 on the lateral display 120, the CAVS menu appears on the lateral display 120, proximate the neighbor traffic, and when the user selects a traffic 54 on the VSD 122, the CAVS menu appears on the VSD 122, proximate the traffic 54 (refer to FIG. 3, menu 304).

At 1008, the predetermined data quality criteria are applied to the neighbor traffic data in the received ADS-B data, which creates a filtered subset of the neighbor traffic. As mentioned, the filtered subset of neighbor traffic is referred to as "filtered traffic" for short. The image on the VSD 122 is updated responsive to the filtered traffic; in various embodiments, this means that filtered traffic are displayed in a visually distinguishable manner when compared to the display of the remaining neighbor traffic. Subsequent to viewing the updated image on the VSD 122, when the user attempts to select a neighbor traffic on the VSD 122, the CAVS VSD module 104 may limit user selection on the VSD 122 to the filtered traffic, i.e., it only allows selection of neighbor traffic that are members of the filtered traffic subset.

At 1010, responsive to receiving a user selected target (user selected traffic 54), the CAVS VSD module 104 concurrently updates the lateral display 120 and the VSD 122 updated as follows. The selected target is rendered in a visually distinguishable manner (see FIGS. 3-8) with respect to the remaining displayed traffic on the vertical image 204 and on the lateral image 202. In addition, a menu 304 allowing for the selection of CAVS application features is displayed proximate to the selected traffic 54 (see, for example, FIG. 3 and FIG. 4). The CAVS dialogue box 402 allows the user to enter a range distance 404. Once the user's selections are activated (406), a newly entered or selected range distance 404 overrides previously selected or default range distances 404. Responsive to activating (406) the CAVS features, the CAVS VSD module 104 concurrently commands the lateral display 120 and the VSD 122 to update the lateral image and the vertical image (i) visually distinguish the user selected traffic 54 from the remaining neighbor traffic, and (ii) depict the user selected range distance 404. Concurrently depicting the user selected range distance 404 comprises rendering (i) on the lateral image 202, a symbol such as an arc 504 at a distance in front of the ownship 50 representative of the range distance 404, and (ii) the vertical image 204, a symbol such as a vertical line 502, in front of the ownship 50 at a distance representative of the range distance 404.

At 1012, the CAVS VSD module 104 continuously determines the distance between the ownship 50 and the user selected traffic 54. This determination may be in nautical miles (nm). The determined distance between the ownship 50 and the user selected traffic 54 is continuously compared to the user selected range distance 404 and other relevant variables, such as TCAS distances. Based on the results of the comparison at 1012, the CAVS VSD module 104 generates alerts at 1014. As mentioned above, there may be an advisory alert and a cautionary alert, each easily distinguishable from the other by a pilot. In addition, the alerts may comprise an audible component. From 1014, the method 1000 may end, for example, if the target lands or the method 1000 may return to 1012 for continuously determining the separation distance between the ownship 50 and the user selected traffic 54.

As is readily appreciated, the above examples of CAVS procedures on a VSD 122 are non-limiting, and many others may be addressed by the CAVS VSD module 104. Thus, systems and methods directed to improvements in the presentation of CAVS procedures on an aircraft display system over conventional CAVS systems are provided. Specifically, the vertical display not only provides another area of the display system 112 to select and designate neighbor traffic as CAVS targets, but also provides additional relevant visual approach information, such as a vertical distance between the ownship and the target aircraft, descent rates of the ownship and the target and an alerting function for the user-selected CAVS range.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 136 and containing computer instructions stored therein for causing a computer processor (such as the processor 150) to perform and execute the program 136. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

What is claimed is:

1. A Cockpit Display of Traffic Information (CDTI) assisted Visual Separation (CAVS) System comprising:
- a lateral display;
- a vertical situation display (VSD); and
- a control module coupled to the lateral display and the VSD, the control module comprising a processor and a memory device, and configured to:
  - receive traffic data from an automatic dependent surveillance broadcast (ADS-B);
  - command the lateral display to render a lateral image and the VSD to render a vertical image, each image comprising neighbor traffic and features associated with a cockpit display of traffic information (CDTI) Assisted Visual Separation (CAVS) application;
    - filter the traffic data with a predetermined data quality criteria, creating a filtered traffic subset of the traffic data;
    - command the VSD and the lateral display to render the filtered traffic in a visually distinct manner with respect to remaining neighbor traffic;
  - receive, from at least one of the VSD and the lateral display, a user selection from among the filtered traffic;
  - upon reception of the user selected filtered traffic,
  - command the lateral display and the VSD to concurrently update the lateral image and the vertical image to
    - (i) visually distinguish the user selected filtered traffic from remaining neighbor traffic, and
    - (ii) render a dialogue box to prompt the user to enter a range distance.

2. The CAVS system of claim 1, wherein the user selected filtered traffic is the VSD.

3. The CAVS system of claim 1, wherein the control module is further configured to limit user selection on the VSD to only filtered traffic.

4. The CAVS system of claim 1, wherein the control module is further configured to, upon reception of the user selected filtered traffic,
- remove unselected neighbor traffic from the VSD.

5. The CAVS system of claim 4, wherein visually distinguishing the user selected traffic from remaining neighbor traffic comprises rendering a highlighted shape surrounding the selected traffic.

6. The CAVS system of claim 5, wherein depicting a user selected range distance comprises rendering, on the lateral image, an arc at a distance in front of the ownship representative of the range distance, and rendering, on the vertical image, a vertical line in front of the ownship at a distance representative of the range distance.

7. The CAVS system of claim 1, wherein the control module is further configured to, upon reception of the user selected filtered traffic, continuously, and in real time, determine a distance between an ownship and the user selected traffic.

8. The CAVS system of claim 7, wherein the control module is further configured to compare the determined distance between the ownship and the user selected filtered traffic to the user selected range distance, and generate an alert based on the comparison of the determined distance between the ownship and the user selected filtered traffic to the user selected range distance.

9. A method for Cockpit Display of Traffic Information (CDTI) assisted Visual Separation (CAVS), comprising:
- at a control module,
  - receiving traffic data from an automatic dependent surveillance broadcast (ADS-B);
  - commanding a lateral display to render a lateral image and a VSD to render a vertical image, each image comprising neighbor traffic and features associated with a cockpit display of traffic information (CDTI) Assisted Visual Separation (CAVS) application;
  - filtering the traffic data with a predetermined data quality criteria, creating a filtered traffic subset of the traffic data;
  - commanding the VSD and the lateral display to render the filtered traffic in a visually distinct manner with respect to remaining neighbor traffic;
  - receiving, from at least one of the VSD and the lateral display, a user selection from among the filtered traffic;
  - upon reception of the user selected filtered traffic, commanding the lateral display and the VSD to concurrently update the lateral image and the vertical image to:
    - (i) visually distinguish the user selected filtered traffic from remaining neighbor traffic, and
    - (ii) render a dialogue box to prompt the user to enter a range distance.

10. The method of claim 9, further comprising:
- receiving a user selected range distance; and
- commanding the lateral display and the VSD to concurrently depict the user selected range distance.

11. The method of claim 9, further comprising, limiting user selection on the VSD to only the filtered traffic.

12. The method of claim 9, wherein commanding the lateral display and the VSD to concurrently visually distinguish the user selected filtered traffic from remaining neighbor traffic comprises rendering a highlighted shape surrounding the selected traffic.

13. The method of claim 12, wherein commanding the lateral display and the VSD to concurrently depict a user selected range distance comprises rendering, on the lateral image, an arc at a distance in front of the ownship representative of the range distance, and rendering, on the vertical image, a vertical line in front of the ownship at a distance representative of the range distance.

14. The method of claim 13, further comprising continuously, and in real time, determining a distance between an ownship and the selected filtered traffic.

15. The method of claim 14, further comprising comparing the determined distance between the ownship and the selected filtered traffic to the user selected range distance.

16. The method of claim 15, further comprising generating an alert based on the comparison of the determined distance between the ownship and the selected filtered traffic to the user selected range distance.

* * * * *